July 14, 1931.  A. L. COWDREY  1,814,667
TRAFFIC SIGNAL INDICATOR
Filed Dec. 6, 1926
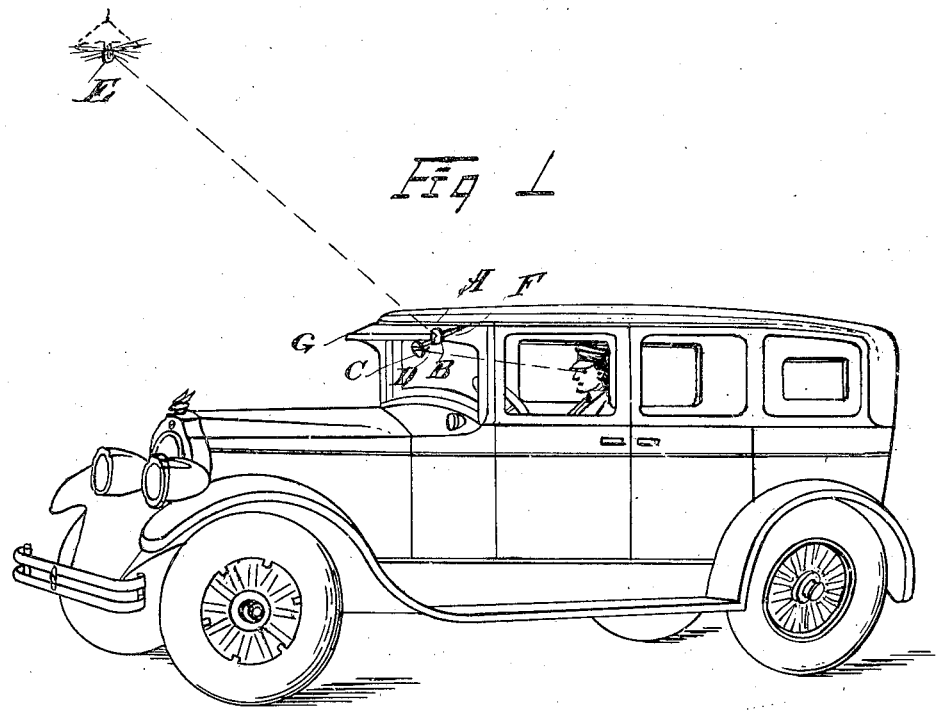
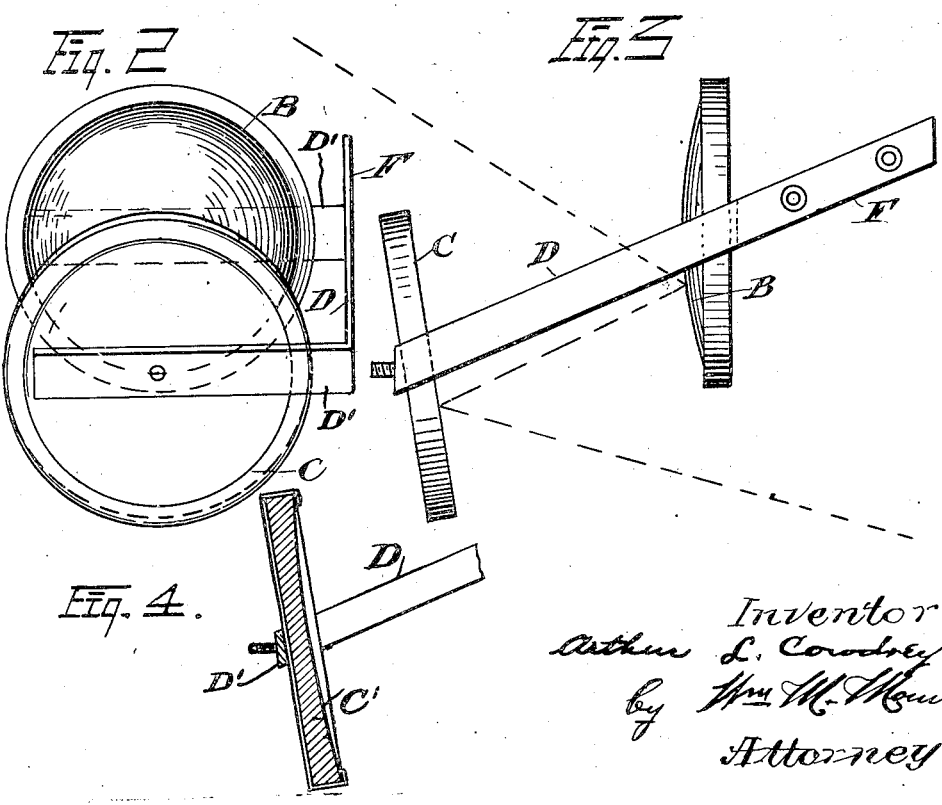

Patented July 14, 1931

1,814,667

UNITED STATES PATENT OFFICE

ARTHUR L. COWDREY, OF CLEVELAND HEIGHTS, OHIO

TRAFFIC SIGNAL INDICATOR

Application filed December 6, 1926. Serial No. 152,919.

The objects of the invention are to provide a simple and efficient device for enabling the driver of an automobile to see clearly the elevated traffic signals at street intersections when the car is so close to them that the front of the cover of the car or the visor thereon intervenes between the eye of the driver and the signal.

To overcome this disadvantage a combination of convex and flat mirrors is provided whereby the eye of the driver in his position at the wheel of the car will be able to follow the signal as the car advances and until the car is close to the same.

The device comprises—a convex mirror attached to the front bow or outer edge of the visor at one side thereof: The signal light impinges directly upon the convex mirror, and thence is directed to a rearwardly reflecting mirror in advance of the convex mirror which directs the signal into the eye of the driver.

The convexity of the first named mirror enables the rays of light to be continuously reflected to the second mirror as the angle of incidence changes with the position of the car so that the driver can watch the signal until he drives directly underneath the same.

In this manner the signal light becomes visible after the front row has passed between the eye of the driver and the signal light. And the danger of passing a stop signal which would arise from the interposition of the cover or visor will be avoided.

The invention is hereinafter more fully described, illustrated in the accompanying drawings, and specifically pointed out in the claim—

In the accompanying drawings Figure 1 is perspective of an automobile showing the device attached to the front bow thereof; Figure 2 is a front elevation of the device; Figure 3 is a side elevation and Figure 4 is a vertical section showing a magnifying mirror.

In these views A represents the front bow, B is a convex mirror secured thereto, C is a mirror spaced forwardly therefrom and at a slightly lower level and connected with the mirror B by means of an inclined bar D and transverse bars D' D', but placed at such an angle relatively thereto that a ray of light proceeding from an elevated signal lamp E which may be either red or green or yellow in front of the top, but invisible to the driver—will be reflected from the convex mirror B onto the flat mirror and thence to the eye of the driver.

The convexity of the convex upper mirror causes the ray from whatever angle it may be received to be transmitted to the lower mirror—which could not occur if the first mirror to receive the ray were flat—since the angle of reflection equals the angle of incidence.

This permits the driver to receive the vision of the signal lamp continuously when approaching the lamp until the car is beneath the same and there will be no danger of missing a change of signal or of passing a stop signal, the two mirrors are substantially parallel with each other since the line of vision is always forward and when close to each other as shown the lower mirror may be tilted slightly, if desired.

In Fig. 3 the inclined bar D which connects the mirrors is shown extended at F to permit it to be attached to the side of the visor G. In Figure 4 the mirror C' is shown to be slightly concave thus serving to magnify the image of the signal before it reaches the eye of the driver of the car.

Having described the invention what I claim as new and desire to secure by Letters Patent is:

In a front reflector for overhead traffic signals, a support comprising a shank affixed to the visor of a car, and provided with lateral arms arranged at different levels thereon, a convex mirror upon the upper arm, and a concave mirror upon the lower arm, said upper mirror being inclined to reflect the rays from said overhead traffic signal to said lower mirror, and thence to the eye of the driver of the car.

In testimony whereof I hereunto affix my signature.

ARTHUR L. COWDREY.